(12) United States Patent
Ushiwata et al.

(10) Patent No.: US 8,406,585 B2
(45) Date of Patent: Mar. 26, 2013

(54) OPTICAL WAVEGUIDE, OPTICAL WIRING MEMBER, AND METHOD OF MOUNTING OPTICAL DEVICE ON OPTICAL WIRING MEMBER

(75) Inventors: Takami Ushiwata, Hitachi (JP); Kouki Hirano, Hitachinaka (JP)

(73) Assignee: Hitachi Cable, Ltd., Tokyo (JP)

( * ) Notice: Subject to any disclaimer, the term of this patent is extended or adjusted under 35 U.S.C. 154(b) by 39 days.

(21) Appl. No.: 12/748,574

(22) Filed: Mar. 29, 2010

(65) Prior Publication Data

US 2010/0247035 A1 Sep. 30, 2010

(30) Foreign Application Priority Data

Mar. 30, 2009 (JP) .................................. 2009-082310
Mar. 30, 2009 (JP) .................................. 2009-082311

(51) Int. Cl.
*G02B 6/26* (2006.01)
*G02B 6/36* (2006.01)

(52) U.S. Cl. ............................... 385/27; 385/88; 385/52

(58) Field of Classification Search ..................... 385/27, 385/45, 48, 50, 52, 88, 129–132, 14
See application file for complete search history.

(56) References Cited

U.S. PATENT DOCUMENTS

| 4,770,529 | A * | 9/1988 | Levinson et al. | 356/153 |
| 4,892,374 | A * | 1/1990 | Ackerman et al. | 385/49 |
| 2002/0044720 | A1* | 4/2002 | Brophy et al. | 385/17 |
| 2004/0008946 | A1* | 1/2004 | Jung et al. | 385/45 |

FOREIGN PATENT DOCUMENTS

JP 2007-017559 1/2007

* cited by examiner

*Primary Examiner* — Sarah Hahm
(74) *Attorney, Agent, or Firm* — Antonelli, Terry, Stout & Kraus, LLP.

(57) ABSTRACT

An optical wiring member according to the present invention includes: a substrate on which a light-emitting device and a light-receiving device are mounted; and an optical waveguide comprising a communication optical waveguide core and an optical waveguide clad that entirely covers the communication optical waveguide core, the optical waveguide being mounted on the substrate, in which the optical waveguide is equipped with a position-aligning light guiding portion for introducing position-aligning light into the communication optical waveguide core. By using, as a target light, the position-aligning light that is introduced into the communication optical waveguide core 3 and exits from the substrate, at least either the light-emitting device or the light-receiving device can be positioned.

14 Claims, 5 Drawing Sheets

OPTICAL WAVEGUIDE, OPTICAL WIRING MEMBER, AND METHOD OF MOUNTING OPTICAL DEVICE ON OPTICAL WIRING MEMBER

CLAIM OF PRIORITY

The present application claims priority from Japanese patent applications: serial no. 2009-082310 filed on Mar. 30, 2009; and serial no. 2009-082311 filed on Mar. 30, 2009, the contents of which are hereby incorporated by reference into this application.

BACKGROUND OF THE INVENTION

1. Field of the Invention

The present invention relates to an optical waveguide which enables light to be used for positioning both a light-emitting device and a light-receiving device, and to an optical wiring member including the optical waveguide. Furthermore, the invention relates to a method of mounting optical devices on an optical wiring member.

2. Description of Related Art

In electronic devices, such as communication devices, information processing devices, household electrical appliances, and the like, optical signals are sometimes used to transmit information within an electronic device or between an electronic device and an outside device. In comparison with the electrical signal, the optical signal is advantageous in terms of transmitting a large capacity of information (fast communication rate), having no influence of electromagnetic noise, and the like.

To transmit optical signals, an electronic device is equipped with an optical wiring member. The optical wiring member includes a substrate and an optical waveguide comprising an optical waveguide core disposed on the substrate and an optical waveguide clad which entirely covers the optical waveguide core (hereafter, also simply referred to as "optical waveguide"). When an optical wiring member is mounted on an electronic device, a light-emitting device (LD; laser diode) and a light-receiving device (PD; photodiode) are mounted on the surface of the substrate on which the optical waveguide is not disposed. On the optical waveguide core, a mirror is formed at a location that faces the light-emitting device and at a location that faces the light-receiving device, thereby optical signals emitted from the light-emitting device reach the light-receiving device via the optical waveguide (see, e.g., JP-A 2007-17559).

As described above, on a substrate, there is a location at which a light-emitting device is mounted and there is a location at which a light-receiving device is mounted, and before mounting the light-emitting device and the light-receiving device (collectively referred to as "optical devices"), those mounting locations must be properly positioned. Conventionally, there is a position-aligning method which has the advantage of the property that an optical waveguide core allows light to efficiently pass through. In this method, when light, such as illuminating light, is emitted on one end of the optical waveguide core, i.e., a location at which an optical device is mounted, the light exits from the other end of the optical waveguide core, i.e., a location at which the other optical device is mounted, and therefore, optical devices are positioned using the light as a target.

However, in this conventional method, once an optical device is mounted to one end of the optical waveguide core described, e.g., in JP-A 2007-17559, illuminating light can no longer be introduced into the optical waveguide core from that location; therefore, it is impossible for the light to exit from the other end and serve as a target for positioning the other optical device. This means that light can be used only for positioning either a light-emitting device or a light-receiving device.

SUMMARY OF THE INVENTION

In order to solve the above problem, it is an objective of the present invention to provide an optical waveguide which enables light to be used for positioning both a light-emitting device and a light-receiving device, and to provide an optical wiring member including the optical waveguide. Furthermore, it is another objective of the invention to provide a method of mounting optical devices on an optical wiring member.

(1) According to an aspect of the present invention, there is provided an optical waveguide comprising: a communication optical waveguide core; and an optical waveguide clad which entirely covers the communication optical waveguide core, in order to transmit communication light between a light-emitting device and a light-receiving device, and further including a position-aligning light guiding portion for introducing position-aligning light into the communication optical waveguide core.

In the above aspect (1), the following modifications and changes can be made.

(i) A plurality of the communication optical waveguide cores and an optical waveguide clad which entirely covers the plurality of the communication optical waveguide cores are provided, and the position-aligning light guiding portion is provided for each of the plurality of the communication optical waveguide cores.

(2) According to another aspect of the present invention, there is provided an optical wiring member which includes: a substrate on that a light-emitting device and a light-receiving device are mounted; and an optical waveguide comprising a communication optical waveguide core and an optical waveguide clad which entirely covers the communication optical waveguide core, in order to transmit communication light between a light-emitting device and a light-receiving device, the optical waveguide being mounted on the substrate, in that the optical waveguide is equipped with a position-aligning light guiding portion for introducing position-aligning light into the communication optical waveguide core.

In the above aspect (2), the following modifications and changes can be made.

(ii) The position-aligning light guiding portion comprises: a position-aligning optical waveguide core formed in the optical waveguide so that the position-aligning optical waveguide core intersects with the communication optical waveguide core; an optical waveguide clad which entirely covers the position-aligning optical waveguide core; and a position-aligning mirror for reflecting position-aligning light radiated on the substrate into the position-aligning optical waveguide core.

(iii) The position-aligning mirror is located: on the same plane as is a communication light mirror for reflecting communication light radiated from the light-emitting device into the communication optical waveguide core; or on the same plane as is a communication light mirror for reflecting communication light from the communication optical waveguide core on the light-receiving device.

(iv) As the position-aligning light guiding portion, only a position-aligning light guiding portion for the light-receiving device is provided.

(v) As the position-aligning light guiding portion, both a position-aligning light guiding portion for the light-emitting device and a position-aligning light guiding portion for the light-receiving device are provided.

(vi) Plural sets of light-emitting device and light-receiving device are mounted on the substrate; a plurality of the communication optical waveguide cores and an optical waveguide clad which entirely covers the plurality of the communication optical waveguide cores are provided; and the position-aligning light guiding portion is provided for each of the plurality of the communication optical waveguide cores.

(vii) The position-aligning light guiding portion comprises: a plurality of position-aligning optical waveguide cores formed in the optical waveguide so that those position-aligning optical waveguide cores intersect with one of the different communication optical waveguide cores; an optical waveguide clad which entirely covers the plurality of the position-aligning optical waveguide cores; and a plurality of position-aligning mirrors for reflecting position-aligning light radiated on the substrate into each of the position-aligning optical waveguide cores, in that two position-aligning optical waveguide cores are disposed between adjacent communication optical waveguide cores so that each of the two position-aligning optical waveguide cores intersects with each one of two communication optical waveguide cores.

(viii) The two position-aligning optical waveguide cores disposed between the adjacent communication optical waveguide cores are laid out in different locations in a longitudinal direction of the communication optical waveguide core.

(ix) The two position-aligning optical waveguide cores disposed between the adjacent communication optical waveguide cores branch from a common optical waveguide equipped with a position-aligning mirror.

(x) The position-aligning light guiding portion comprises: a position-aligning optical waveguide core formed in the optical waveguide so that the position-aligning optical waveguide core intersects with all of the plurality of the communication optical waveguide cores; and a position-aligning mirror for reflecting position-aligning light radiated on the substrate into the position-aligning optical waveguide core.

(3) According to still another aspect of the present invention, there is provided a method of mounting an optical device on an optical wiring member, the optical wiring member including: a substrate on which, as the optical device, at least one set of light-emitting device and light-receiving device are mounted; and an optical waveguide comprising a communication optical waveguide core and an optical waveguide clad which entirely covers the communication optical waveguide core in order to transmit communication light between the light-emitting device and the light-receiving device, the optical waveguide being mounted on the substrate. Furthermore, the optical waveguide is equipped with a position-aligning light guiding portion for introducing position-aligning light into the communication optical waveguide core; and at least either the light-emitting device or the light-receiving device is positioned by using, as a target light, position-aligning light which is introduced from the position-aligning light guiding portion into the communication optical waveguide core and exits from the substrate.

In the above aspect (3), the following modifications and changes can be made.

(xi) Position-aligning light is radiated from one mounting location of the substrate into the communication optical waveguide core, and by using, as a target light, the position-aligning light which exits from the other mounting location, either the light-emitting device or the light-receiving device is mounted at the mounting location. Subsequently, position-aligning light is radiated on the position-aligning light guiding portion, and by using, as a target light, the position-aligning light that exits from the other mounting location, the other optical device is positioned at the mounting location.

(xii) After mounting the light-emitting device and the light-receiving device on the substrate, an optical shielding is provided in the position-aligning light guiding portion.

ADVANTAGE OF THE INVENTION

The present invention has the following excellent advantages.

(a) Light can be used for positioning both a light-emitting device and a light-receiving device.

(b) The width of the optical wiring member does not increase.

BRIEF DESCRIPTION OF THE DRAWINGS

FIG. 2A and FIG. 25 are schematic illustrations showing a side view of an optical wiring member explaining one process of a method of mounting optical devices on an optical wiring member according to the present invention.

DETAILED DESCRIPTION OF THE PREFERRED EMBODIMENTS

Hereafter, a preferred embodiment of the present invention will be described with reference to the accompanying drawings. However, the present invention is not limited to the embodiment described herein.

First Embodiment of Present Invention

Figure 1A:
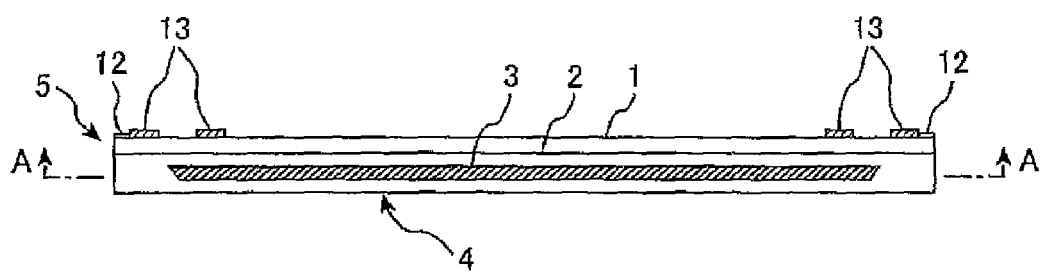
FIG. 1A is a schematic illustration showing a side view of an optical wiring member according to a first embodiment of the present invention.
Figure 1B:
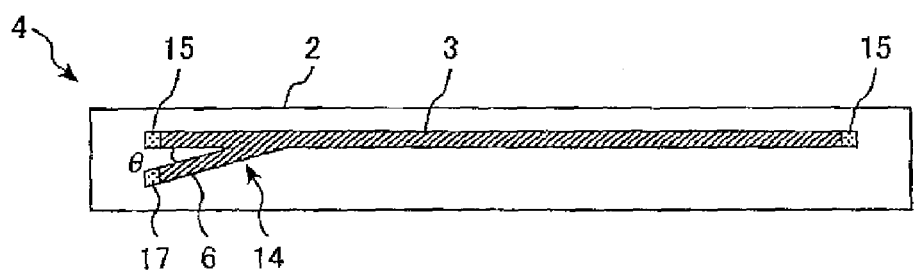
FIG. 1B is a schematic illustration showing a cross-sectional view taken substantially along the line A-A in FIG. 1A.

FIG. 1A is a schematic illustration showing a side view of an optical wiring member according to a first embodiment of the present invention, and FIG. 1B is a schematic illustration showing a cross-sectional view taken substantially along the line A-A in FIG. 1A. As shown in FIGS. 1A and 1B, an optical waveguide 4 according to the present invention comprises a communication optical waveguide core 3 and an optical waveguide clad 2 which entirely covers the communication optical waveguide core 3 in order to transmit communication light between a light-emitting device 18 (see, e.g., FIG. 2B)

and a light-receiving device 19 (see, e.g., FIG. 2B), in that a position-aligning light guiding portion 14 is provided to introduce position-aligning light into the communication optical waveguide core 3.

Furthermore, an optical wiring member 5 according to the present invention is structured such that an optical waveguide 4 comprising a communication optical waveguide core 3 and an optical waveguide clad 2 which entirely covers the communication optical waveguide core 3 in order to transmit communication light between a light-emitting device 18 and a light-receiving device 19 are disposed on a substrate 1 on that the light-emitting device 18 (see, e.g., FIG. 2B) and the light-receiving device 19 (see, e.g., FIG. 2B) are mounted. The optical waveguide 4 is equipped with a position-aligning light guiding portion 14 to introduce position-aligning light into the communication optical waveguide core 3.

Also, as shown in FIG. 1A, electrical wiring 12 is provided on the electrically-wiring surface (the surface on which optical devices are mounted) of the substrate 1. A part of the electrical wiring 12 serves as a device mounting portion 13 for mounting optical devices. Since the device mounting portion 13 and the electrical wiring 12 are electrically connected, optical devices mounted to the device mounting portion 13 are also electrically connected to the electrical wiring 12. Then, the electrical wiring 12 is used to connect the optical wiring member 5 to an outside device.

On the other hand, as shown in FIG. 1B, the illustrated optical waveguide 4 has a simplified shape, and a communication optical waveguide core 3 is formed linearly from the vicinity at one end to the vicinity at the other end of an elongated rectangle optical waveguide clad 2. The shape of the optical waveguide clad 2 and the pattern of the communication optical waveguide core 3 are not intended to be limited to those illustrated and can be any shape or pattern.

The optical waveguide 4 has good transmittance and refractive index difference large enough to transmit the communication light and the position-aligning light. The optical waveguide 4 comprises a communication optical waveguide core 3 and a position-aligning optical waveguide core 6, described later, and an optical waveguide clad 2 which entirely covers the communication optical waveguide core 3 and the position-aligning optical waveguide core 6 and has a refractive index lower than that of the communication optical waveguide core 3 and the position-aligning optical waveguide core 6. Any member can be selected as material for the optical waveguide 4, and for example, glass, quartz or highly flexible materials, such as acrylic resin, epoxy resin, silicone resin, polycarbonate resin, polystyrene resin, and polyimide resin, are used.

A communication light mirror (micro-mirror) 15 is formed on both ends of the communication optical waveguide core 3. A light-emitting device 18 and a light-receiving device 19 are mounted on the surface of the substrate 1 located above those communication light mirrors 15 (see, e.g., FIG. 2B). In that process, the light-emitting device 18 and the light-receiving device 19 must be properly positioned so that the light-emitting surface of the light-emitting device 18 and the light-receiving surface of the light-receiving device 19 face each of the communication light mirrors 15. Herein, the light-emitting device 18 is mounted facing the communication light mirror 15 located on the left in the drawing and the light-receiving device 19 is mounted facing the communication light mirror 15 located on the right in the drawing.

A position-aligning light guiding portion 14 comprises: a position-aligning optical waveguide core 6 formed in the optical waveguide clad 2 so that the position-aligning optical waveguide core 6 intersects with the communication optical waveguide core 3; an optical waveguide clad 2 which entirely covers the position-aligning optical waveguide core 6; and a position-aligning mirror 17 that reflects position-aligning light radiated from the substrate 1 into the position-aligning optical waveguide core 6. The position-aligning optical waveguide core 6 is also considered an optical waveguide core that branches from the communication optical waveguide core 3. Besides, the communication light mirror 15 and the position-aligning mirror 17 can be created by forming an inclined notched surface on the optical waveguide core and by providing a multilayer reflection coating or a metal reflection coating (e.g., Au, Al, or the like) on the inclined notched surface.

With regard to the position-aligning light guiding portion 14, both a position-aligning light guiding portion (not shown) for the light-emitting device 18 and a position-aligning light guiding portion 14 for the light-receiving device 19 can be provided. However, in FIG. 1B, only a position-aligning light guiding portion 14 for the light-receiving device 19 is provided.

In the position-aligning light guiding portion 14 for the light-receiving device 19, the position-aligning optical waveguide core 6 is disposed so that angle θ at which the position-aligning optical waveguide core 6 intersects with the communication optical waveguide core 3 can be an acute angle (less than 90 degrees) when viewed from the light-emitting device 18 mounting location (the position of the communication light mirror 15 located on the left in the drawing). When viewed from the light-receiving device 19 mounting location, the angle at which the position-aligning optical waveguide core 6 intersects with the communication optical waveguide core 3 is an obtuse angle since the angle is a supplementary angle of angle θ.

The position at which the position-aligning optical waveguide core 6 intersects with the communication optical waveguide core 3 is arbitrary in the longitudinal direction of the communication optical waveguide core 3. However, in FIG. 1B, the position at which the position-aligning optical waveguide core 6 intersects with the communication optical waveguide core 3 is comparatively close to the light-emitting device 18 mounting location.

The position at which the position-aligning mirror 17 is disposed (terminal end of the position-aligning optical waveguide core 6) is arbitrary. Besides, in FIG. 1B, the position-aligning mirror 17 and the communication light mirror 15 which reflects communication light emitted from the light-emitting device 18 into the communication optical waveguide core 3 are disposed at the same position in a longitudinal direction of the substrate 1 (on the same line in a transverse direction of the substrate 1). The alignment of the position-aligning mirror 17 and the communication light mirror 15 in FIG. 1B can be achieved by dicing once. Thereby, the communication light mirror 15 and the position-aligning mirror 17 are located on the same plane.

Figure 2A:
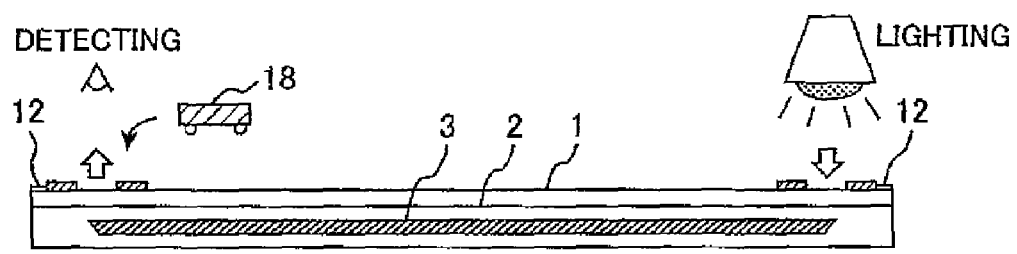
Figure 2B:
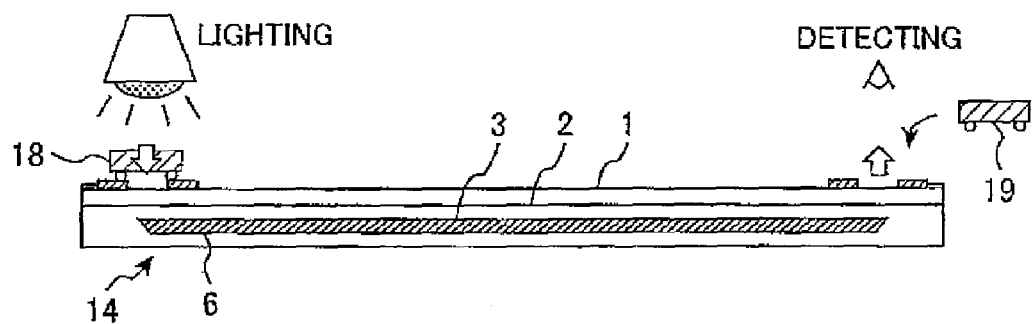

Next, description will be given about the procedures for mounting the light-emitting device 18 and the light-receiving device 19 on the optical wiring member 5 shown in FIG. 1A. FIG. 2A and FIG. 2B are schematic illustrations showing a side view of an optical wiring member explaining one process of a method of mounting optical devices on an optical wiring member according to the present invention.

First, as shown in FIG. 2A, position-aligning light is radiated from the light-receiving device 19 mounting location on the substrate 1 into the communication optical waveguide core 3. The position-aligning light is generally available visible light or light obtained from a laser device or an LED device. Position-aligning light passes through: the substrate 1; optical waveguide clad 2; communication optical waveguide core 3; optical waveguide clad 2; and the substrate 1, and finally exits from the light-emitting device 18 mounting location. In this procedure, the light-emitting device 18 can be positioned at the proper mounting location by using, as a target light, the position-aligning light which exits from the light-emitting device 18 mounting location. Herein, it is preferable that the substrate 1 be a substrate with good transmittance with regard to the communication light and the position-aligning light because there is no need to form a through-hole on the substrate 1 for the communication light and the position-aligning light to pass through. However, it is possible to use a substrate having poor transmittance with regard to the communication light and the position-aligning light and form a through-hole on the substrate 1 for the communication light and the position-aligning light to pass through. Furthermore, either a rigid substrate or a flexible substrate can be used for a substrate 1.

Subsequently, as shown in FIG. 2B, the position-aligning light is radiated on the position-aligning light guiding portion 14. Because the position-aligning optical waveguide core 6 in the position-aligning light guiding portion 14 intersects with the communication optical waveguide core 3, the position-aligning light is introduced from the position-aligning optical waveguide core 6 into the communication optical waveguide core 3. This position-aligning light exits from the light-receiving device 19 mounting location. Consequently, the light-receiving device 19 can be positioned at the proper mounting location by using, as a target light, the position-aligning light which exits from the light-emitting device 19 mounting location.

Thus, the light-emitting device 18 and the light-receiving device 19 are mounted on the substrate 1, and then an optical shielding (not shown) is provided for the position-aligning light guiding portion 14. The optical shielding can be provided by attaching a resin plate or a metal plate which is impenetrable to light onto the substrate 1 or by coating the substrate 1 with paint so that the top of the position-aligning mirror 17 can be covered.

As explained in the above procedures, according to the method of mounting optical devices on an optical wiring member in accordance with the present invention, the optical wiring member 5 is equipped with the position-aligning light guiding portion 14 to introduce position-aligning light into the communication optical waveguide core 3 in addition to the communication optical waveguide core 3. Therefore, after the light-emitting device 18 has been positioned by radiating the position-aligning light from the light-receiving device 19 mounting location into the communication optical waveguide core 3, the position-aligning light is radiated on the position-aligning light guiding portion 14 and then the light exits from the light-receiving device 19 mounting location. In this manner, position-aligning light can be used for positioning both the light-emitting device 18 and the light-receiving device 19.

According to the method of mounting optical devices on an optical wiring member in accordance with the present invention, an optical shielding is provided for the position-aligning light guiding portion 14 after the light-emitting device 18 and the light-receiving device 19 have been mounted on the substrate 1. Therefore, it is possible to prevent outside light from entering the position-aligning light guiding portion 14 while the optical wiring member 5 is operating.

In this embodiment, the position-aligning optical waveguide core 6 in the position-aligning light guiding portion 14 for the light-receiving device 19 intersects with the communication optical waveguide core 3 at angle θ, which is an acute angle, when viewed from the light-emitting device 18 mounting location. Due to this configuration, while the optical wiring member 5 is operating, only a small amount of communication light emitted from the light-emitting device 18 leaks in the position-aligning optical waveguide core 6 and most of the communication light reaches the light-receiving device 19 passing through the communication optical waveguide core 3.

In the above description, the optical wiring member 5 is equipped with only the position-aligning light guiding portion 14 for the light-receiving device 19, however, the optical wiring member 5 can be equipped with only the position-aligning light guiding portion for the light-emitting device 18. In that case, procedures are as follows: first, position-aligning light is radiated from the light-emitting device 18 mounting location of the substrate 1 into the communication optical waveguide core 3 in order to position the light-receiving device 19; and subsequently, position-aligning light is radiated on the position-aligning light guiding portion for the light-emitting device 18 thereby positioning the light-emitting device 18. When both the position-aligning light guiding portion for the light-emitting device 18 and the position-aligning light guiding portion 14 for the light-receiving device 19 are provided, sequential order of positioning the light-emitting device 18 and the light-receiving device 19 is arbitrary.

When a position-aligning light guiding portion for the light-emitting device 18 is provided, the position-aligning optical waveguide core 6 intersects with the communication optical waveguide core by forming an acute angle to the light-receiving device 19 mounting location. Therefore, while the optical wiring member 5 is operating, a relatively large amount of communication light emitted from the light-emitting device 18 leaks from the position-aligning optical waveguide core 6.

In the above description, the position-aligning optical waveguide core 6 is formed linearly so that it intersects with the communication optical waveguide core 3 at angle θ. However, the present invention is not intended to be limited to this structure, but the position-aligning optical waveguide core 6 can be formed in a curved line. For example, the position-aligning optical waveguide core 6 can intersect with the communication optical waveguide core 3 at angle θ, and around the location of the position-aligning mirror 17, a curved portion with an appropriate curvature is provided in the position-aligning optical waveguide core 6 so that the position-aligning optical waveguide core 6 is parallel to the communication optical waveguide core 3.

In order to prevent communication light from leaking in the position-aligning optical waveguide core 6, it is also possible to provide the position-aligning optical waveguide core 6 close to the communication optical waveguide core 3 instead of the position-aligning optical waveguide core 6 intersecting with the communication optical waveguide core 3. In this case, communication light will not leak in the position-aligning optical waveguide core 6 because the communication optical waveguide core 3 is entirely covered with an optical waveguide clad 2 even in the location where the communication optical waveguide core 3 comes very close to the position-aligning optical waveguide core 6. It is possible to properly introduce the position-aligning light into the communication optical waveguide core 3 by adjusting: the distance between the communication optical waveguide core 3 and the position-aligning optical waveguide core 6; the angle formed between the communication optical waveguide core 3 and the position-aligning optical waveguide core 6; and the refractive index of the communication optical waveguide core 6.

In this embodiment, the light-emitting device 18 side communication light mirror 15 and the position-aligning mirror 17 are on the same plane. This is advantageous when mirrors are formed by dicing because the communication light mirror 15 and the position-aligning mirror 17 can be formed in one dicing process. The mirrors can be formed by laser processing or the like. Besides, the mirrors may be formed on different planes each other.

In the above description, only one communication optical waveguide core 3 is formed on the substrate 1 of the optical wiring member 5. However, even when a plurality of communication optical waveguide cores 3 are formed on the substrate 1 in such a case as a multi-channel optical wiring member, by providing a position-aligning light guiding portion 14 for each communication optical waveguide core 3, it is possible to position both the light-emitting device 18 and the light-receiving device 19 with regard to any communication optical waveguide cores 3 according to the present invention.

Second Embodiment of Present Invention

Figure 3A:
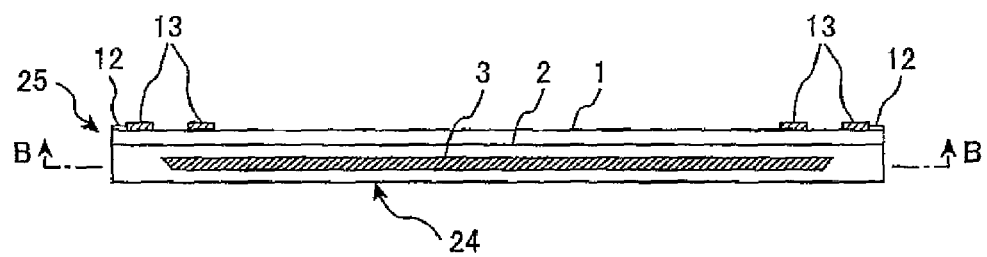
FIG. 3A is a schematic illustration showing a side view of an optical wiring member according to a second embodiment of the present invention.

Hereafter, a second embodiment of the present invention will be described with reference to the attached drawings. FIG. 3A is a schematic illustration showing a side view of an optical wiring member according to a second embodiment of the present invention, and FIG. 3B is a schematic illustration showing a cross-sectional view taken substantially along the line B-B in FIG. 3A.

Figure 3B:
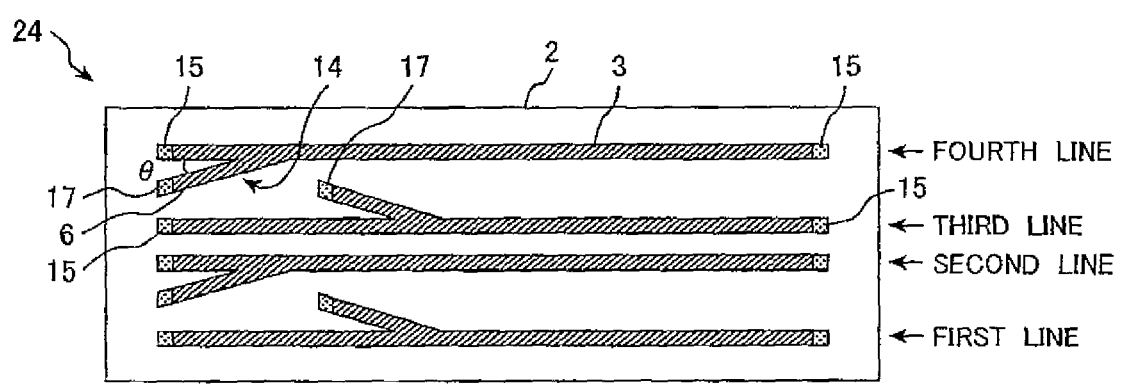
FIG. 3B is a schematic illustration showing a cross-sectional view taken substantially along the line B-B in FIG. 3A.

As shown in FIGS. 3A and 3B, an optical waveguide 24 according to the present invention comprises a plurality of communication optical waveguide cores 3 and an optical waveguide clad 2 which entirely covers the plurality of communication optical waveguide cores 3 in order to transmit communication light between a light-emitting device 18 (see, e.g., FIG. 2B) and a light-receiving device 19 (see, e.g., FIG. 2B), in that a plurality of position-aligning light guiding portions 14 are provided to introduce position-aligning light into the communication optical waveguide cores 3.

Furthermore, an optical wiring member 25 according to the present invention is structured such that an optical waveguide 24 comprising a plurality of communication optical waveguide cores 3 and an optical waveguide clad 2 which entirely covers the plurality of communication optical waveguide cores 3 in order to transmit communication light between a plurality of light-emitting devices 18 and a plurality of light-receiving devices 19 are disposed on a substrate 1 on that the plurality of light-emitting devices 18 (see, e.g., FIG. 2B) and the plurality of light-receiving devices 19 (see, e.g., FIG. 2B) are mounted. The optical waveguide 24 is equipped with a position-aligning light guiding portion 14 to introduce position-aligning light into each of the communication optical waveguide cores 3.

Also, as shown in FIG. 3A, electrical wiring 12 is provided on the electrically-wiring surface (the surface on which optical devices are mounted) of the substrate 1. A part of the electrical wiring 12 serves as a device mounting portion 13 for mounting optical devices. Since the device mounting portion 13 and the electrical wiring 12 are electrically connected, optical devices mounted to the device mounting portion 13 are also electrically connected to the electrical wiring 12. Then, the electrical wiring 12 is used to connect the optical wiring member 25 to an outside device.

On the other hand, as shown in FIG. 3B, the illustrated optical waveguide 24 has a simplified shape, and a plurality of communication optical waveguide cores 3 are formed linearly in parallel to one another from the vicinity at one end to the vicinity at the other end of an elongated rectangle optical waveguide clad 2. The shape of the optical waveguide clad 2 and the pattern of the communication optical waveguide cores 3 are not intended to be limited to those illustrated and can be any shape and pattern.

The position-aligning light guiding portion 14 comprises: a plurality of position-aligning optical waveguide cores 6 formed in the optical waveguide clad 2 so that each of the plurality of position-aligning optical waveguide cores 6 intersects with one of the plurality of different communication optical waveguide cores 3; an optical waveguide clad 2 which entirely covers the plurality of position-aligning optical waveguide cores 6; and a plurality of position-aligning mirrors 17 that reflect position-aligning light radiated on the substrate 1 into each position-aligning optical waveguide core 6. The position-aligning optical waveguide core 6 is also considered an optical waveguide core that branches from the communication optical waveguide core 3.

On an optical wiring member 25 in this embodiment, two position-aligning optical waveguide cores 6 each of which intersects with one of two adjacent communication optical waveguide cores 3 are disposed between the two adjacent communication optical waveguide cores 3. That is, as shown in FIGS. 3A and 3B, the position-aligning optical waveguide core 6 which intersects with the first-line communication optical waveguide core 3 is disposed on the second-line side of the first-line communication optical waveguide core 3, and the position-aligning optical waveguide core 6 which intersects with the second-line communication optical waveguide core 3 is disposed on the first-line side of the second-line communication optical waveguide core 3. The same configuration is applied to the third line and the fourth line.

Furthermore, the two position-aligning optical waveguide cores 6 located between two adjacent communication optical waveguide cores 3 are disposed in different locations in a longitudinal direction of the communication optical waveguide cores 3. That is, the position-aligning optical waveguide core 6 which intersects with the second-line communication optical waveguide core 3 is disposed to the left, in the drawing, of the position-aligning optical waveguide core 6 that intersects with the first-line communication optical waveguide core 3. Due to this configuration, first-line and second-line position-aligning optical waveguide cores 6 and position-aligning mirrors 17 do not obstruct with one another.

The position at which the position-aligning mirror 17 is disposed (terminal end of the position-aligning optical waveguide core 6) is arbitrary. However, in FIG. 3B, the position-aligning mirrors 17 in odd lines are disposed at the same position in a longitudinal direction of the substrate 1 as well as are the communication light mirrors 15 in odd lines that reflect communication light emitted from light-emitting devices into communication optical waveguide cores 3. The communication light mirror 15 and the position-aligning mirror 17 are on the same plane.

According to the optical wiring member 25 of the present invention wherein an optical waveguide comprising a plurality of communication optical waveguide cores 3 and an optical waveguide clad 2 which entirely covers the plurality of communication optical waveguide cores 3 is disposed on the substrate 1 on that a plurality of light-emitting devices 18 and a plurality of light-receiving devices 19 are mounted, a position-aligning light guiding portion 14 is provided to introduce position-aligning light into the communication optical waveguide core 3. Consequently, according to the procedures described later, light can be used for positioning both the light-emitting devices 18 and the light-receiving devices 19.

In the optical wiring member 25 shown in FIG. 3B, the position-aligning light guiding portion 14 comprises: a plurality of position-aligning optical waveguide cores 6 formed on the substrate 1 so that each of the position-aligning optical waveguide cores 6 intersects with one of the different communication optical waveguide cores 3; and a plurality of position-aligning mirrors 17 that reflect position-aligning light radiated on the substrate 1 into each of the position-aligning optical waveguide cores 6. Moreover, two position-aligning optical waveguide cores 6 each of which intersects with one of two different adjacent communication optical waveguide cores 3 are disposed between the two adjacent communication optical waveguide cores 3. This means that two position-aligning optical waveguide cores 6 are disposed between the first-line communication optical waveguide core 3 and the second-line communication optical waveguide core 3. Due to this configuration, there is no need to provide a position-aligning optical waveguide core 6 between the second-line communication optical waveguide core 3 and the third-line communication optical waveguide core 3, therefore, the interval between those communication optical waveguide cores 3 does not need to be increased. Consequently, the width of the substrate 1 does not have to be increased much when a plurality of position-aligning optical waveguide cores 6 are provided, and the width of the substrate 1 does not become thick.

Furthermore, according to the optical wiring member 25 shown in FIGS. 3A and 3B, two position-aligning optical waveguide cores 6 located between two adjacent communication optical waveguide cores 3 are disposed in different locations in the longitudinal direction of the communication optical waveguide core 3, therefore, the two position-aligning optical waveguide cores 6 do not obstruct with each other.

Figure 4A:
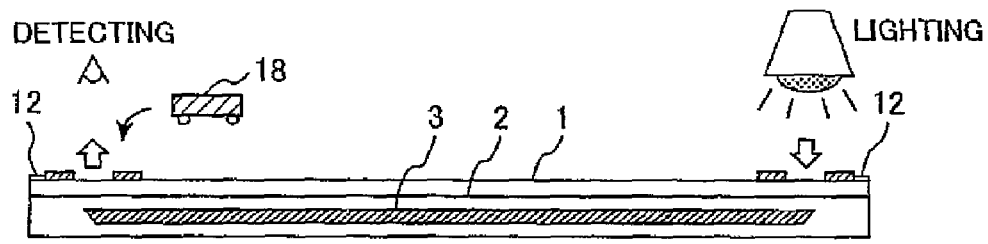
FIG. 4A through FIG. 4C are schematic illustrations showing a side view of an optical wiring member explaining another process of a method of mounting optical devices on an optical wiring member according to the present invention.
Figure 4B:
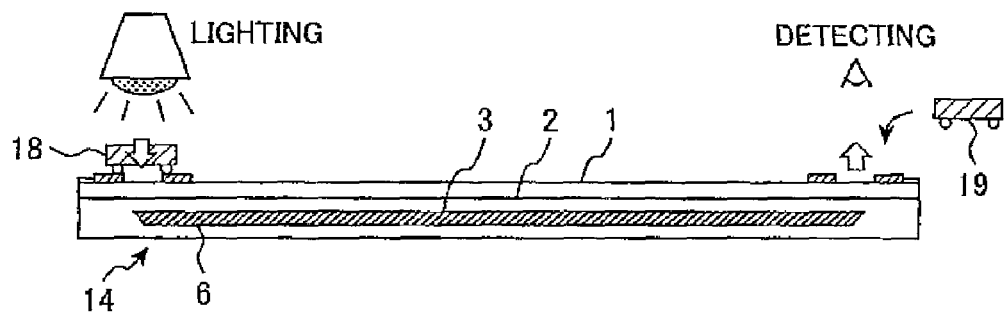
Figure 4C:
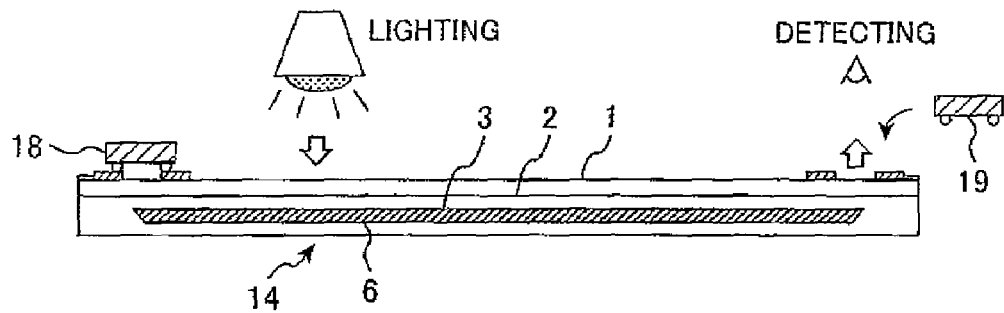

Next, description will be given about the procedures for mounting the light-emitting device 18 and the light-receiving device 19 on the optical wiring member 25 shown in FIG. 3A. FIG. 4A through FIG. 4C are schematic illustrations showing a side view of an optical wiring member explaining another process of a method of mounting optical devices on an optical wiring member according to the present invention.

First, as shown in FIG. 4A, position-aligning light is radiated from the light-receiving device 19 mounting location of the substrate 1 into the communication optical waveguide core 3. The position-aligning light is generally available visible light or light obtained from a laser device or an LED device. Position-aligning light passes through the communication optical waveguide core 3 and exits from the light-emitting device 18 mounting location. In this procedure, the light-emitting device 18 can be positioned at the proper mounting location by using, as a target light, the position-aligning light which exits from the light-emitting device 18 mounting location. Herein, it is preferable that the substrate 1 be a substrate with good transmittance with regard to the communication light and the position-aligning light because there is no need to form a through-hole on the substrate 1 for the communication light and the position-aligning light to pass through. However, it is possible to use a substrate having poor transmittance with regard to the communication light and the position-aligning light and form a through-hole on the substrate 1 for the communication light and the position-aligning light to pass through. Furthermore, either a rigid substrate or a flexible substrate can be used for a substrate 1.

Subsequently, as shown in FIG. 4B when positioning a light-receiving device in an odd line in FIG. 3B, and as shown in FIG. 4C when positioning a light-receiving device in an even line in FIG. 3B, the position-aligning light is radiated on the position-aligning light guiding portion 14. Because the position-aligning optical waveguide core 6 in the position-aligning light guiding portion 14 intersects with the communication optical waveguide core 3, the position-aligning light is introduced from the position-aligning optical waveguide core 6 into the communication optical waveguide core 3. This position-aligning light exits from the light-receiving device 19 mounting location. Consequently, the light-receiving device 19 can be positioned at the proper mounting location by using, as a target light, the position-aligning light which exits from the light-emitting device 19 mounting location.

Thus, the light-emitting device 18 and the light-receiving device 19 are mounted on the substrate 1, and then an optical shielding (not shown) is provided for the position-aligning light guiding portion 14. The optical shielding can be provided by attaching a resin plate or a metal plate which is impenetrable to light onto the substrate 1 or by coating the substrate 1 with paint so that the top of the position-aligning mirror 17 can be covered.

As explained in the above procedures, according to the method of mounting optical devices on an optical wiring member in accordance with the present invention, the optical wiring member 25 is equipped with the position-aligning light guiding portion 14 to introduce position-aligning light into the communication optical waveguide core 3 in addition to the communication optical waveguide core 3. Therefore, after the light-emitting device 18 has been positioned by radiating the position-aligning light from the light-receiving device 19 mounting location into the communication optical waveguide core 3, the position-aligning light is radiated on the position-aligning light guiding portion 14 and then the light exits from the light-receiving device 19 mounting location. In this manner, position-aligning light can be used for positioning both the light-emitting device 18 and the light-receiving device 19.

In this embodiment, the communication light mirror 15 on the light-emitting device 18 side and the position-aligning mirror 17 in an odd line are on the same plane. This is advantageous when mirrors are formed by dicing because the communication light mirror 15 and the position-aligning mirror 17 can be formed in one dicing process. If those mirrors are not on the same plane, (for example, in cases when a position-aligning mirror is formed in the position-aligning light guiding portion 14 as shown in FIG. 4C), mirrors can be formed by laser processing or the like.

Third Embodiment of Present Invention

Figure 5:
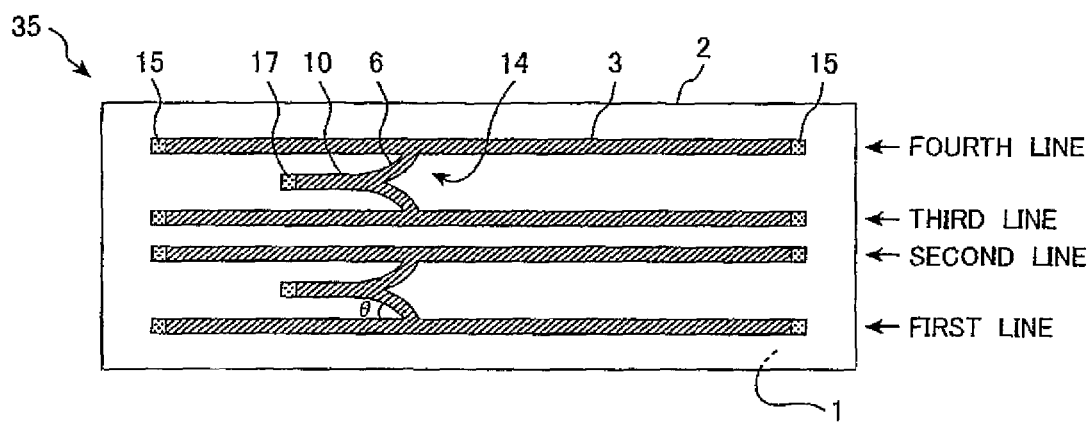
FIG. 5 is a schematic illustration showing a plan view of an optical wiring member according to a third embodiment of the present invention.

Next, an optical wiring member according to a third embodiment of the present invention will be described with reference to the attached drawings. FIG. 5 is a schematic illustration showing a plan view of an optical wiring member according to a third embodiment of the present invention.

In the optical wiring member 35 as shown in FIG. 5, two position-aligning optical waveguide cores 6 located between two adjacent communication optical waveguide cores 3 are split from a common optical waveguide core 10 equipped with one position-aligning mirror 17. The common optical waveguide core 10 is provided between an odd-line communication optical waveguide core 3 and an even-line communication optical waveguide core 3. The position-aligning optical waveguide core 6 intersects with the communication optical waveguide core 3 at angle $\theta$, and then it is bent at an appropriate curvature up to the common optical waveguide core 10.

Also in this optical wiring member 35, there is no need to provide a position-aligning optical waveguide core 6 between the second-line communication optical waveguide cores 3 and the third-line communication optical waveguide cores 3, therefore, the interval between those communication optical waveguide cores 3 does not need to be increased. Consequently, the width of the substrate 1 does not have to be increased much when a plurality of position-aligning optical waveguide cores 6 are provided, and the width of the substrate 1 does not become thick.

In FIG. 5, the position-aligning mirror 17 is not located on the same plane as is the communication light mirror 15, and those mirrors are formed in different locations in a longitudinal direction of the optical waveguide 4. However, it is possible to form those mirrors on the same plane, and in that case, one dicing process can form both mirrors.

Fourth Embodiment of Present Invention

Figure 6:
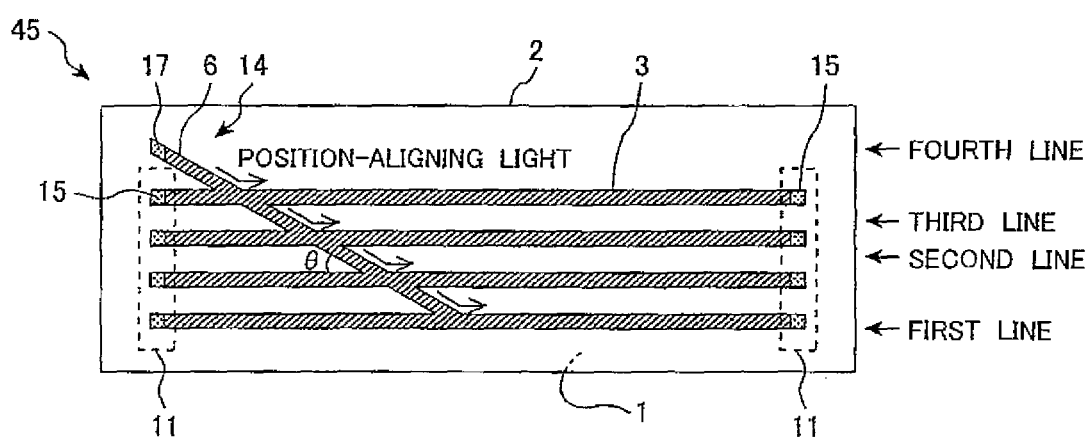
FIG. 6 is a schematic illustration showing a plan view of an optical wiring member according to a fourth embodiment of the present invention.

Next, an optical wiring member according to a fourth embodiment of the present invention will be described with reference to the attached drawings. FIG. 6 is a schematic illustration showing a plan view of an optical wiring member according to a fourth embodiment of the present invention.

The optical wiring member 45, as shown in FIG. 6, comprises one position-aligning optical waveguide core 6 formed on a substrate 1 so that the position-aligning light guiding portion 14 intersects with all of the plurality of communication optical waveguide cores 3, and a position-aligning mirror 17 which reflects position-aligning light radiated on the substrate 1 into the position-aligning optical waveguide core 6. Herein, the position-aligning optical waveguide core 6 is formed linearly so that it intersects with the communication optical waveguide cores 3 at constant angle θ.

Position-aligning light radiated on the substrate 1 at the location of the position-aligning mirror 17 passes through the position-aligning optical waveguide core 6 and is divided into components which go straight through the position-aligning optical waveguide core 6 and components that leak into communication optical waveguide cores 3 at each location at which the position-aligning optical waveguide core 6 intersects with each of the first to fourth line communication optical waveguide cores 3. In this configuration, it is possible to introduce position-aligning light into all of the communication optical waveguide cores 3 by providing a position-aligning light guiding portion 14 comprising one position-aligning mirror 17 and one position-aligning optical waveguide core 6.

The optical wiring member 45 shown in FIG. 6 is not equipped with an individual position-aligning light guiding portion 14 between communication optical waveguide cores 3, therefore, a plurality of communication optical waveguide cores 3 can be disposed at comparatively small intervals. Consequently, the width of the substrate 1 does not have to be increased much when a position-aligning light guiding portion 14 is provided, and the width of the substrate 1 does not become thick.

Furthermore, in the optical wiring member 45 in FIG. 6, a plurality of communication optical waveguide cores 3 can be disposed at equal intervals. Due to this configuration, the optical wiring member 45 is applicable when a plurality of light-emitting devices and light-receiving devices mounted on a substrate 1 are array devices 11.

Although the present invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical waveguide, comprising: a communication optical waveguide core; and an optical waveguide clad which entirely covers the communication optical waveguide core, in order to transmit communication light between a light-emitting device and a light-receiving device, wherein there is provided a position-aligning light guiding portion for introducing position-aligning light radiated on a terminal of said position-aligning guiding portion into said communication optical waveguide core and for letting said position-aligning light introduced exit from a location to mount said light-emitting device or said light-receiving device, and wherein said position-aligning light guiding portion comprises: a position-aligning optical waveguide core formed in said optical waveguide so that the position-aligning optical waveguide core intersects with said communication optical waveguide core;

an optical waveguide clad which entirely covers said position-aligning optical waveguide core; and a position-aligning mirror for reflecting position-aligning light radiated into said position-aligning optical waveguide core.

2. The optical waveguide according to claim 1, wherein a plurality of said communication optical waveguide cores and an optical waveguide clad which entirely covers the plurality of said communication optical waveguide cores are provided, and said position-aligning light guiding portion is provided for each of the plurality of said communication optical waveguide cores.

3. An optical wiring member, including:

a substrate on which a light-emitting device and a light-receiving device are mounted; and an optical waveguide comprising a communication optical waveguide core and an optical waveguide clad that entirely covers said communication optical waveguide core, in order to transmit communication light between said light-emitting device and said light-receiving device, said optical waveguide being mounted on said substrate, wherein said optical waveguide is equipped with a position-aligning light guiding portion for introducing position-aligning light radiated on a terminal of said position-aligning light guiding portion into said communication optical waveguide core and for letting said position-aligning light introduced exit from a location to mount said light-emitting device or said light-receiving device, and wherein said position-aligning light guiding portion comprises: a position-aligning optical waveguide core formed in said optical waveguide so that the position-aligning optical waveguide core intersects with said communication optical waveguide core;

an optical waveguide clad which entirely covers said position-aligning optical waveguide core; and a position-aligning mirror for reflecting position-aligning light radiated into said position-aligning optical waveguide core.

4. The optical wiring member according to claim 3, wherein said position-aligning mirror is located:

on the same plane as is a communication light mirror for reflecting communication light radiated from said light-emitting device into said communication optical waveguide core; or on the same plane as is a communication light mirror for reflecting communication light from said communication optical waveguide core on said light-receiving device.

5. The optical wiring member according to claim 3, wherein, as said position-aligning light guiding portion, only a position-aligning light guiding portion for said light-receiving device is provided.

6. The optical wiring member according to claim 3, wherein, as said position-aligning light guiding portion, both a position-aligning light guiding portion for said light-emitting device and a position-aligning light guiding portion for said light-receiving device are provided.

7. The optical wiring member according to claim 3, wherein: plural sets of light-emitting device and light-receiving device are mounted on said substrate;
a plurality of said communication optical waveguide cores and an optical waveguide clad which entirely covers the plurality of said communication optical waveguide cores are provided; and
said position-aligning light guiding portion is provided for each of the plurality of said communication optical waveguide cores.

8. The optical wiring member according to claim 7, wherein said position-aligning light guiding portion comprises:
a plurality of position-aligning optical waveguide cores formed in said optical waveguide so that those position-aligning optical waveguide cores intersect with one of said different communication optical waveguide cores;
an optical waveguide clad which entirely covers the plurality of said position-aligning optical waveguide cores; and
a plurality of position-aligning mirrors for reflecting position-aligning light radiated on said substrate into each of said position-aligning optical waveguide cores, and wherein
two position-aligning optical waveguide cores are disposed between adjacent communication optical waveguide cores so that each of the two position-aligning optical waveguide cores intersects with each one of two communication optical waveguide cores.

9. The optical wiring member according to claim 8, wherein said two position-aligning optical waveguide cores disposed between said adjacent communication optical waveguide cores are laid out in different locations in a longitudinal direction of said communication optical waveguide core.

10. The optical wiring member according to claim 8, wherein said two position-aligning optical waveguide cores disposed between said adjacent communication optical waveguide cores branch from a common optical waveguide equipped with a position-aligning mirror.

11. The optical wiring member according to claim 7, wherein said position-aligning light guiding portion comprises: a position-aligning optical waveguide core formed in said optical waveguide so that the position-aligning optical waveguide core intersects with all of the plurality of said communication optical waveguide cores; and
a position-aligning mirror for reflecting position-aligning light radiated on said substrate into said position-aligning optical waveguide core.

12. A method of mounting an optical device on an optical wiring member, said optical wiring member including: a substrate on which, as said optical device, at least one set of light-emitting device and light-receiving device are mounted; and an optical waveguide comprising a communication optical waveguide core and an optical waveguide clad which entirely covers said communication optical waveguide core in order to transmit communication light between said light-emitting device and said light-receiving device, said optical waveguide being mounted on said substrate, comprising the steps of
using, as said optical waveguide, an optical waveguide which is equipped with a position-aligning light guiding portion for introducing position-aligning light into said communication optical waveguide core; and
positioning at least either said light-emitting device or said light-receiving device by using, as a target light, position-aligning light which is radiated on a terminal of said position-aligning light guiding portion, is introduced from said position-aligning light guiding portion into said communication optical waveguide core, and exits from a location of said substrate to mount said light-emitting device or said light-receiving device.

13. The method of mounting an optical device on an optical wiring member according to claim 12, wherein the step of positioning at least either said light-emitting device or said light-receiving device comprises the steps of
radiating position-aligning light from one mounting location of said substrate into said communication optical waveguide core,
mounting either said light-emitting device or said light-receiving device at the mounting location by using, as a target light, said position-aligning light which exits from the other mounting location,
subsequently, radiating position-aligning light on said position-aligning light guiding portion, and
positioning the other optical device is positioned at the mounting location by using, as a target light, said position-aligning light that exits from the other mounting location.

14. The method of mounting an optical device on an optical wiring member according to claim 12, further comprising the step of
providing an optical shielding in said position-aligning light guiding portion, after positioning said light-emitting device and said light-receiving device on said substrate.

* * * * *